Figure 5:
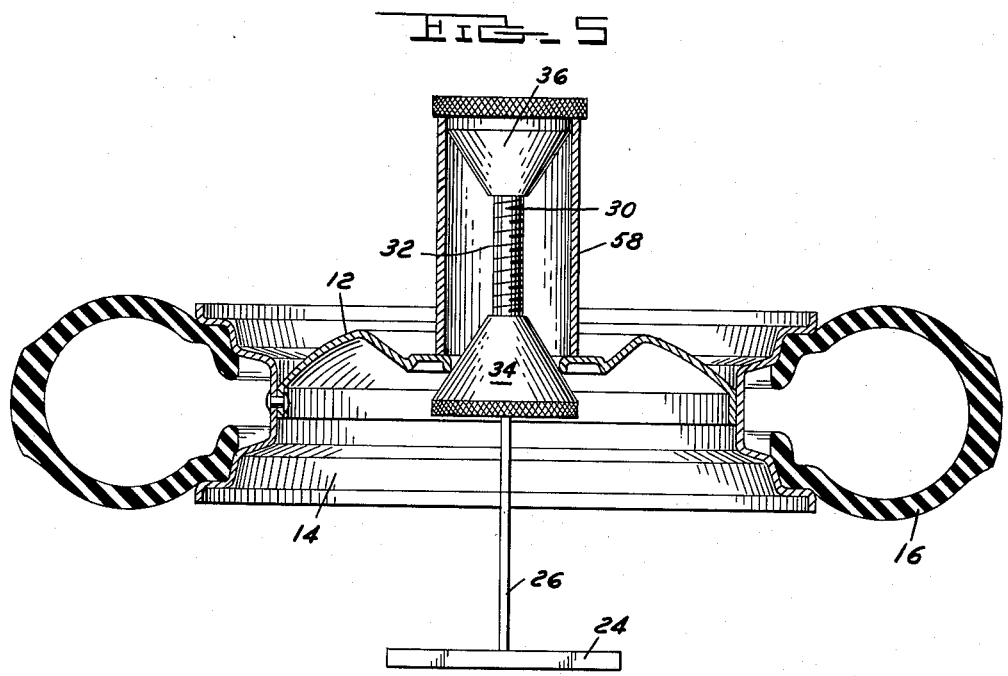

April 6, 1954   J. E. GOLTRA   2,674,122
WHEEL BALANCING MACHINE
Filed March 21, 1951   2 Sheets-Sheet 1
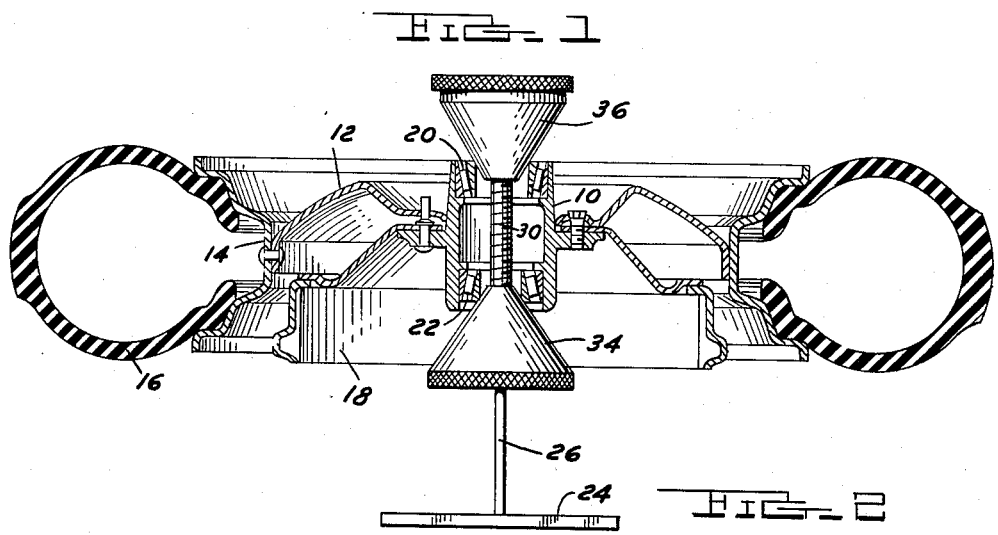
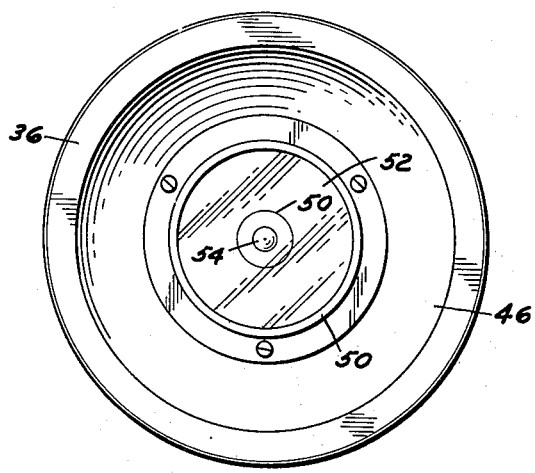
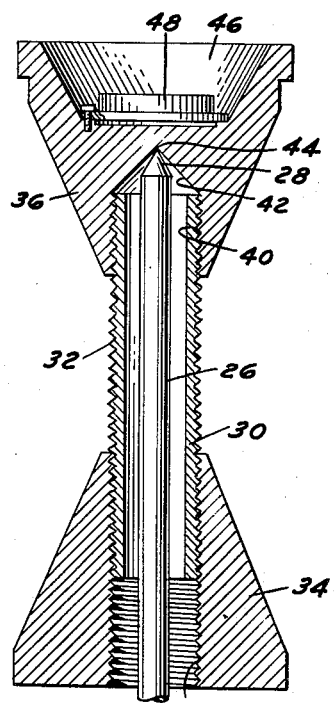
INVENTOR.
Judson E. Goltra
BY
Burton & Parker
ATTORNEYS April 6, 1954

J. E. GOLTRA 2,674,122

WHEEL BALANCING MACHINE

Filed March 21, 1951

2 Sheets-Sheet 2

INVENTOR.
Judson E. Goltra
BY
Burton & Parker
ATTORNEYS

Patented Apr. 6, 1954

2,674,122

UNITED STATES PATENT OFFICE 2,674,122

WHEEL BALANCING MACHINE

Judson Edward Goltra, Detroit, Mich.

Application March 21, 1951, Serial No. 216,700

4 Claims. (Cl. 73—66)

This invention relates to motor vehicle wheel balancing devices and particularly to an improved precision device for balancing automobile wheels.

Heretofore it has been the general practice to remove the motor vehicle wheel and tire from the hub and test the balance of the wheel by inserting an implement through the hole of the disc portion of the wheel. It has been found that the holes of the disc portions are not manufactured so that the axis of the hole of a wheel disc coincides with the axis of rotation of the wheel. As a result, devices constructed for balancing wheels of this character were inaccurate to the extent of the misalignment of the hole axis with respect to the axis of rotation provided by the wheel hub. The present invention relates to a device which tests the wheel, tire and hub as a unit and thereby avoids the possible inaccuracies which may arise from the off-center relation of the hole in the disc portion of the wheel to its normal axis of rotation.

An important object of the present invention is to provide an improved device for balancing wheels and particularly for balancing the wheels with the hub and bearings included, together with the rim and the tire. Another important object of the invention is to provide a precision device of this character which is self-accommodatable to wheels and hubs of various sizes and which will accurately indicate any off balance of the wheel regardless of its size. A further important object of the invention is to provide a wheel balancing device of this character which is composed of few parts and capable of being fabricated at low cost and used with a minimum amount of labor.

In carrying out the objects of the invention, the device of the present invention includes two conically shaped members which are similar in construction to one another and are arranged in opposed relationship to one another to enter the opposite ends of the hub of a wheel to be tested. The two conically shaped members are adjustably mounted upon a hollow body which in turn is supported at one point upon a stand. The adjustment of either one or both of the conically shaped members is preferably accomplished by fine threaded engagement between the members and the hollow body. Carried by one of the conically shaped members and visible to the eye is a bubble level or other means for accurately indicating any off balance.

Various other objects, advantages and meritorious features of the invention will become more fully apparent from the following specification, appended claims and accompanying drawings wherein:

Fig. 1 is a side elevation of a device embodying the invention and showing in cross section the motor vehicle wheel mounted thereon for testing purposes.

Figure 4:
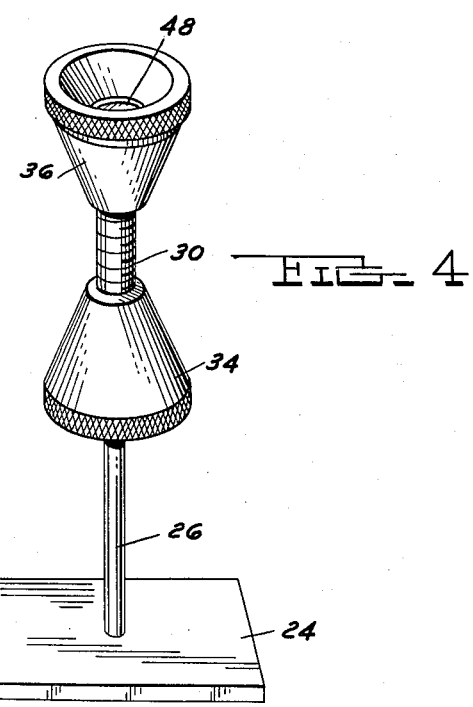

Fig. 2 is a longitudinal cross sectional view through the wheel engaging parts of the device and showing the manner of adjusting the two opposing conical members relative to one another, Fig. 3 is a top plan view of the upper conical member of the device, Fig. 4 is a perspective view of the device with the parts in assembled relationship to one another, and Fig. 5 is a side elevation of the device showing the use of an auxiliary tubular member 58 in section for testing the motor vehicle wheel in the absence of the hub.

Most motor vehicle wheels of the present day include a hub 10, a disc portion 12, a rim 14, and a tire 16. The disc portion bridges the distance between the hub and the rim and supports the latter on the hub. Usually, the disc portion is deformed out of its normal plane in the manner shown in Fig. 1 to improve its appearance. In addition, most vehicle wheels carry a brake drum 18 which is bolted or otherwise secured to the hub 10 such as in the manner illustrated in Fig. 1. In the interior of the hub 10 are bearing assemblies and usually there are two of such assemblies. Roller bearing assemblies 20 and 22 are here shown. These bearing assemblies are usually located in the opposite ends of the hub and journal the latter upon the wheel spindle or axle.

It is an important object of this invention to provide an accurate device for balancing motor vehicle wheels with the hub included therewith. Considerably greater accuracy is obtained by employing this method over the old practice of removing the wheel from its hub and using the circular hole in the disc portion 12 for mounting upon the balancing device. The holes provided in the disc portions 12 of vehicle wheels are not usually machined for aligning their axes with the axes of the hubs to which they are attached. The possibility of such misalignment will cause errors to be produced in the balancing operation which will be present when the wheel is reassembled upon its hub.

The device of the present invention is composed of few parts and in general comprises a stand including a base member 24 and an upright member or rod 26. The rod 26 is tapered or pointed at its upper end, as indicated at 28. Surrounding the upper portion of the rod 26 is a hollow body or sleeve 30. As shown, the sleeve is provided with external threads 32. The threads may run from one end to the other end of the sleeve, as shown in Fig. 2, but at least should be applied to the upper and lower end sections of the sleeve.

Threadedly secured to the sleeve are two conically shaped members arranged thereon with their respective apexes facing toward one another. One conical member is indicated at 34 and is threaded to the lower end section of the sleeve 30. The other conically shaped member is indicated at 36 and is threaded to the upper end section of the sleeve. The two cone shaped members 34 and 36 are generally similar in construction to one another and exhibit similarly formed exterior conical surfaces. The base end of each cone shaped member may be knurled, as shown in Fig. 1 to facilitate turning. The lower cone member 34 is provided with an axial bore 38 extending completely therethrough which is internally threaded for threaded engagement with the sleeve 30. The upper cone member 36 is provided with an auxiliary bore 40 which extends inwardly from its apex end for approximately half the axial dimension of the member and terminates in a conically shaped seat 42, as shown in Fig. 2. The bore 40 is internally threaded for threaded engagement with the upper end of the sleeve 30. The side wall of the conical seat 42 tapers to a point 44 at an angle less than the pointed extremity 28 of the rod 26. In the assembled position of the parts, the pointed extremity 28 of the rod 26 seats against the apex of the conical seat 42 and forms a pivotal support for the two cone members and the sleeve upon which they are assembled.

The base end of the upper cone member 36 is recessed as indicated at 46 and receives a bubble level device generally indicated at 48. The bubble level is preferably of the circular type shown including a circular casing 50, a viewing glass 52 under which the liquid is contained. The bubble in the level is indicated at 54. One or more concentric circular lines 56 may be provided in the base of the casing which are visible to view through the glass 52. It is understood that when the level is inclined to the horizontal plane the bubble 54 will move off of the center of the level. The one or more circular lines 56 serve to indicate whether the bubble is either on or off center.

A motor vehicle wheel to be tested is removed with its hub 10 from the axle or spindle upon which it is journaled. The hub is mounted between the two cone members 34 and 36 by first unscrewing one of the cones from the sleeve 30. It is convenient to remove the sleeve 30 from the rod 26 at the time the hub is positioned between the two cones. After the hub has been positioned in this manner, the removed cone member is threaded back on the sleeve 30 and screwed relatively tightly against the hub. The assembly, including the wheel and hub is then remounted back on the rod 26 in the manner shown in Fig. 1.

One or the other of the two cone members is then further threadedly adjusted on the sleeve 30 toward the other cone member bringing the conical surfaces thereof into tight engagement with the inner races of the roller bearing assemblies 20 and 22 of the hub. In this manner, the bearings of the hub rest upon or bear against the conical surfaces of the cone members just as they do on the spindle or axle of the vehicle. The two cone members are thus exactly centered on the axis of the hub. When mounted in this manner the wheel assembly is free to rotate about its hub axis. Any off balance of the wheel will cause a tilting of the assembly of the two cones and the sleeve 30 relative to the axis of the rod 26 and such off balance will be indicated by the movement of the bubble 54 from the center of its casing. The tire may be marked, as in the usual practice, to indicate where one or more weights should be placed to bring the wheel into place. These weights are attached to the rim of the wheel on the high side while the wheel is on the device to bring the wheel into the horizontal plane on the pivot point formed by the tapered extremity of the rod 26.

What I claim is:

1. A wheel carrier for a wheel balancing machine comprising, in combination, an externally threaded sleeve member, and a pair of cone-shaped members each provided with an internally threaded axial bore engaging the threads of the sleeve member and arranged thereon with the respective apexes of the cone-shaped members facing toward one another, the bore of one of said cone-shaped members extending only part way therethrough and terminating in an internal conical shaped surface axially aligned with the axis of the sleeve member.

2. A wheel carrier for a wheel balancing machine comprising, in combination, an externally threaded open-ended sleeve member adapted in use to extend in a substantially vertical position, a cone-shaped member axially threaded on the lower end of the sleeve member and mounted with the apex of its cone shape directed upwardly, a second cone-shaped member axially threaded on the upper end of the sleeve member and mounted thereon with the apex of its cone shape directed downwardly and in opposed relation to the cone shape of the lower member, said second upper cone-shaped member having an internal portion thereof bridging the upper open end of the sleeve member and provided with an internal conical surface axially converging to an apex aligned with the axis of the sleeve member.

3. A wheel carrier for a wheel balancing machine comprising, in combination, an open ended externally threaded sleeve member, a pair of axially bored internally threaded cone-shaped members threaded on said sleeve member in opposed relation to one another such that the apexes of their respective conical surfaces are directed toward one another, the bore of one of said cone-shaped members extending only part way therethrough and terminating in an internal conical shaped surface having the axis thereof in alignment with the axis of the sleeve member, and a circular type bubble level carried by said last mentioned cone-shaped member and arranged with the center thereof on the axis of the member.

4. A wheel balancing machine comprising, in combination, a member supported in erect position and provided with a tapered pointed upper end, an open-ended externally threaded sleeve surrounding said member and having clearance therearound, a pair of axially bored internally threaded cones threaded on the sleeve in opposed superimposed relationship such that the apexes of the cones face toward one another, a spirit level carried by the upper face of the upper cone, the bore of the upper cone extending only part way therethrough and terminating in an internal converging conical surface having the apex thereof coinciding with the axis of the sleeve, said last cone serving as a cap for the upper open end of the sleeve and having the apex of its internal conical surface in engagement with the pointed upper end of the member for supporting the sleeve and the two cones for limited universal movement thereon.

References Cited in the file of this patent

UNITED STATES PATENTS

| Number | Name | Date |
|---|---|---|
| 2,160,314 | Ongaro | May 30, 1939 |
| 2,214,758 | Bell | Sept. 17, 1940 |
| 2,270,657 | Kraft | Jan. 20, 1942 |
| 2,512,231 | Hart | June 20, 1950 |
| 2,553,058 | Martin | May 15, 1951 |